United States Patent
Park et al.

(10) Patent No.: US 10,975,918 B2
(45) Date of Patent: Apr. 13, 2021

(54) CONE CLUTCH FOR VEHICLE

(71) Applicants: Hyundai Motor Company, Seoul (KR); Kia Motors Corporation, Seoul (KR)

(72) Inventors: Jong Yun Park, Hwaseong-si (KR); Sung Wha Hong, Hwaseong-si (KR); Dong Woo Gwak, Hwaseong-si (KR); Seong Eun Yun, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/787,565

(22) Filed: Feb. 11, 2020

(65) Prior Publication Data

US 2021/0079959 A1  Mar. 18, 2021

(30) Foreign Application Priority Data

Sep. 16, 2019  (KR) .................. 10-2019-0113282

(51) Int. Cl.
*F16D 13/74* (2006.01)
*F16D 13/32* (2006.01)

(52) U.S. Cl.
CPC ............ *F16D 13/32* (2013.01); *F16D 13/74* (2013.01)

(58) Field of Classification Search
CPC .......... F16D 13/24–13/36; F16D 13/72–13/74
See application file for complete search history.

(56) References Cited

U.S. PATENT DOCUMENTS

| 2018/0112720 A1* | 4/2018 | Choi | F16D 13/32 |
| 2018/0142739 A1* | 5/2018 | Park | F16D 23/04 |
| 2018/0142740 A1* | 5/2018 | Park | F16D 23/04 |
| 2018/0154881 A1* | 6/2018 | Heubner | F16D 65/14 |

FOREIGN PATENT DOCUMENTS

| EP | 2055976 A1 * | 5/2009 | ............ F16D 23/04 |
| KR | 10-2018-0058907 A | 6/2018 | |

* cited by examiner

*Primary Examiner* — Charles A Fox
*Assistant Examiner* — Farhana Pervin
(74) *Attorney, Agent, or Firm* — Morgan, Lewis & Bockius LLP

(57) ABSTRACT

A cone clutch apparatus for the vehicle according to an exemplary embodiment of the present invention includes a hub, a sleeve, a clutch ring including a clutch cone, a first friction ring, an internal middle cone, a second friction ring, an external middle cone, and a third friction ring, wherein clutch ring passages allowing oil to be supplied are formed in the clutch cone, and inclined surfaces for increasing areas with which the oil passing through the clutch ring passages are in contact while moving are formed on the internal middle cone, the second friction ring, and the external middle cone.

11 Claims, 12 Drawing Sheets

CONE CLUTCH FOR VEHICLE

CROSS REFERENCE TO RELATED APPLICATION

The present application claims priority to Korean Patent Application No. 10-2019-0113282, filed Sep. 16, 2019, the entire contents of which is incorporated herein for all purposes by this reference.

BACKGROUND OF THE INVENTION

Field of the Invention

The present invention relates to a clutch for a vehicle, and more particularly, to a lubricating structure of a clutch which may be used in a transmission.

Description of Related Art

A plurality of clutches are used in a transmission or the like of a vehicle to intermit power transfer between rotating bodies rotating relative to each other The clutch as described above has a large torque transfer capacity while occupying as small a volume as possible, but generally, to secure a large torque transfer capacity, a volume of the clutch tends to be increased.

Meanwhile, to increase a torque transfer capacity of the clutch, a friction area that generates a frictional force needs to be increased, and in a structure of increasing the friction area by use of a plurality of components in a relatively narrow space, heat capacities of the components themselves are small and it is not easy to secure a space necessary for lubrication and cooling, such that it is difficult to secure durability of the components.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cone clutch for a vehicle which is configured for implementing a relatively large torque transfer capacity while having a simple and compact configuration and occupying a relatively small volume and is configured for securing sufficient durability by allowing lubrication and cooling of used components to be smoothly performed.

According to an exemplary embodiment of the present invention, a cone clutch for a vehicle, includes: a hub mounted so that movement thereof in an axial direction and rotation thereof are restricted to a shaft; a sleeve mounted so that a rotation of the sleeve is restricted to an external side of the hub and a movement of the sleeve in the axial direction is allowed; a clutch ring mounted so that a movement of the clutch ring in the axial direction is restricted and a rotation of the clutch ring is allowed with respect to the shaft and integrally including a clutch cone protruding toward the hub and having a gradually reduced external diameter, a first friction ring provided between the clutch ring and the hub, mounted so that rotation thereof is restricted with respect to the hub, and pressed toward the clutch ring along the axial direction thereof to allow a frictional force to be formed between the first friction ring and the clutch cone; an internal middle cone mounted so that a rotation of the internal middle cone is restricted with respect to the clutch ring and having an internal side surface in contact with an external side surface of the first friction ring; a second friction ring mounted so that a rotation of the second friction ring is restricted with respect to the hub and having an internal side surface in contact with an external side surface of the internal middle cone; an external middle cone mounted so that a rotation of the external middle cone is restricted with respect to the clutch ring and having an internal side surface in contact with an external side surface of the second friction ring; and a third friction ring mounted so that a rotation of the third friction ring is restricted with respect to the hub and having an internal side surface in contact with an external side surface of the external middle cone when the third friction ring is pressed by the sleeve, wherein clutch ring passages through which oil supplied through an internal portion of the shaft and discharged in a radial direction passes and is supplied to a space positioned between the first friction ring and the clutch ring are formed in the clutch cone, and inclined surfaces for increasing areas with which the oil passing through the clutch ring passages are in contact while moving are formed on the internal middle cone, the second friction ring, and the external middle cone.

The shaft may be provided with shaft holes for supplying the oil to the clutch ring passages, and when a portion of the hub is positioned between the shaft holes and the clutch ring passages, the hub may be provided with hub passages through which the oil passing through the shaft holes linearly moves to the clutch ring passages.

The hub passage may be formed of an oil groove, and the clutch ring passage may be formed of an oil hole.

A plurality of oil grooves may be formed in the internal middle cone so that phases thereof along a circumferential direction coincide with those of the clutch ring passages, and some of the oil grooves may form a first inclined surface which is one of the inclined surfaces.

The first inclined surface may be formed by a trajectory along which a straight line inclined toward the clutch ring toward an external diameter direction in a cross section of the internal middle cone along the axial direction rotates along the circumferential direction thereof.

An end portion of the second friction ring close to the clutch ring may form a second inclined surface which is one of the inclined surfaces.

The second inclined surface may be formed by a trajectory along which a straight line starting from a position at which an internal side in the radial direction is further biased toward the clutching ring as compared with the first inclined surface and inclined toward the clutch ring toward the external diameter direction in a cross section of the second friction ring along the axial direction rotates along the circumferential direction thereof.

The second inclined surface may form an angle smaller than an angle formed by the first inclined surface with respect to the shaft.

A plurality of oil grooves may be formed in the external middle cone so that phases thereof along the circumferential direction coincide with those of the oil grooves of the internal middle cone, and some of the oil grooves may form a third inclined surface which is one of the inclined surfaces.

The oil grooves of the external middle cone may be formed to have a width greater, in the circumferential direction, than that of the oil grooves of the internal middle cone.

The third inclined surface may be formed by a trajectory along which a straight line starting from a position at which an internal side in the radial direction is further biased toward the clutching ring as compared with the second inclined surface and inclined toward the clutch ring toward the external diameter direction in a cross section of the external middle cone along the axial direction rotates along the circumferential direction thereof.

The third inclined surface may form an angle smaller than an angle formed by the second inclined surface with respect to the shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
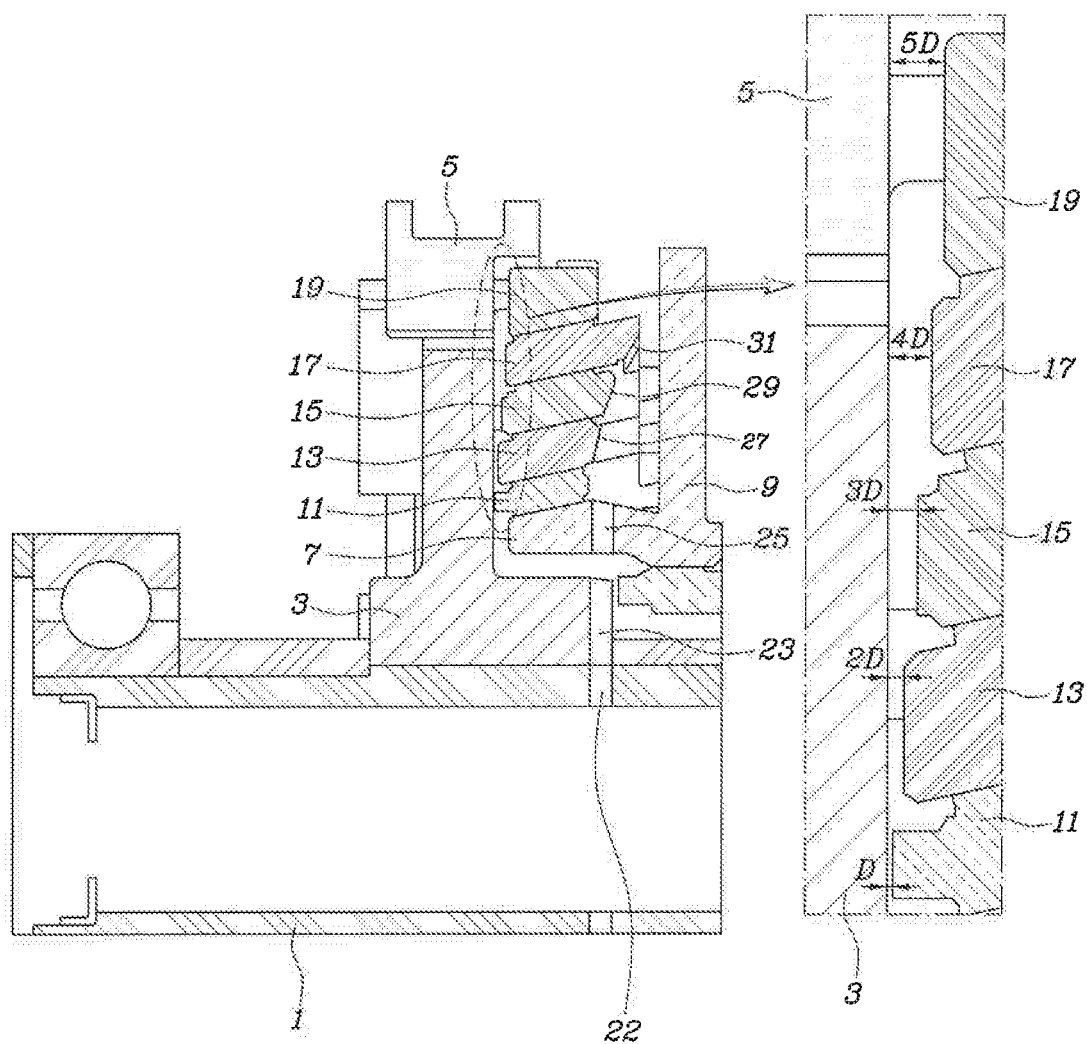
FIG. 1 is a cross-sectional view of a cone clutch for a vehicle according to an exemplary embodiment of the present invention along a shaft direction thereof.
Figure 2:
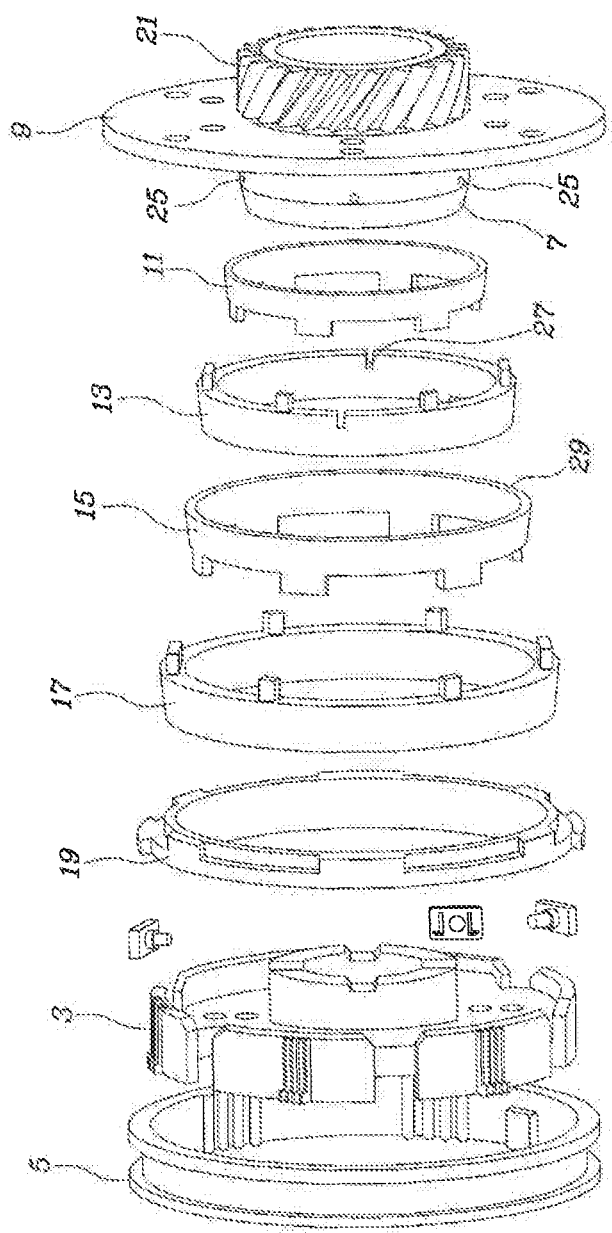
FIG. 2 is an exploded perspective view of the cone clutch of FIG. 1.
Figure 3:
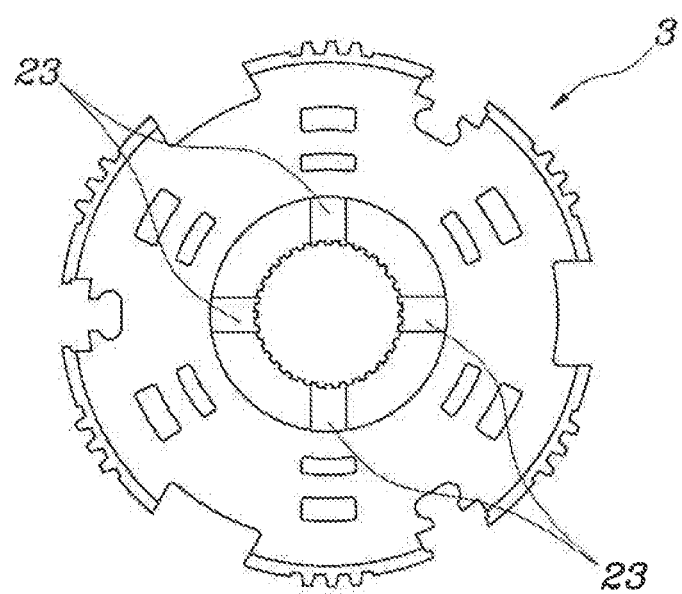
FIG. 3 is a view exemplarily illustrating a hub of FIG. 2.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, FIG. 2, FIG. 3, FIG. 4, and FIG. 5, a cone clutch for a vehicle according to an exemplary embodiment of the present invention is configured to include a hub 3 mounted so that movement thereof in an axial direction and rotation thereof are restricted to a shaft 1; a sleeve 5 mounted so that rotation thereof is restricted to an external side of the hub 3 and a movement thereof in the axial direction is possible; a clutch ring 9 mounted so that movement thereof in the axial direction is restricted and rotation thereof is possible with respect to the shaft 1 and integrally including a clutch cone 7 protruding toward the hub 3 and having a gradually reduced external diameter; a first friction ring 11 provided between the clutch ring 9 and the hub 3, mounted so that rotation thereof is restricted with respect to the hub 3, and pressed toward the clutch ring 9 along the axial direction thereof to allow a frictional force to be formed between the first friction ring 11 and the clutch cone 7; an internal middle cone 13 mounted so that rotation thereof is restricted with respect to the clutch ring 9 and having an internal side surface in contact with an external side surface of the first friction ring 11; a second friction ring 15 mounted so that rotation thereof is restricted with respect to the hub 3 and having an internal side surface in contact with an external side surface of the internal middle cone 13; an external middle cone 17 mounted so that rotation thereof is restricted with respect to the clutch ring 9 and having an internal side surface in contact with an external side surface of the second friction ring 15; and a third friction ring 19 mounted so that rotation thereof is restricted with respect to the hub 3 and having an internal side surface in contact with an external side surface of the external middle cone 17 when the third friction ring is pressed by the sleeve 5.

That is, in a state in which the hub 3 is mounted so that both of the movement thereof in the axial direction thereof and the rotation thereof are restricted onto the shaft 1 and the clutch ring 9 is mounted so that the movement thereof in the axial direction is restricted and the rotation thereof is possible, the cone clutch according to an exemplary embodiment of the present invention is configured to switch between a state in which a torque is transferred between the hub 3 and the clutch ring 9 and a release state in which the torque is not transferred between the hub 3 and the clutch ring 9, and a gear or the like is connected integrally with the clutch ring 9, such that the cone clutch according to an exemplary embodiment of the present invention is ultimately configured to intermit power between the shaft 1 and the gear.

For reference, a gear 21 is coupled integrally with the clutch ring 9.

Here, the cone clutch according to an exemplary embodiment of the present invention may continuously change the transferred torque by continuously varying a frictional force between the hub 3 and the clutch ring 9, and does not transfer a torque by gears by engaged with each other as in a synchromesh device according to the related art.

Figure 4:
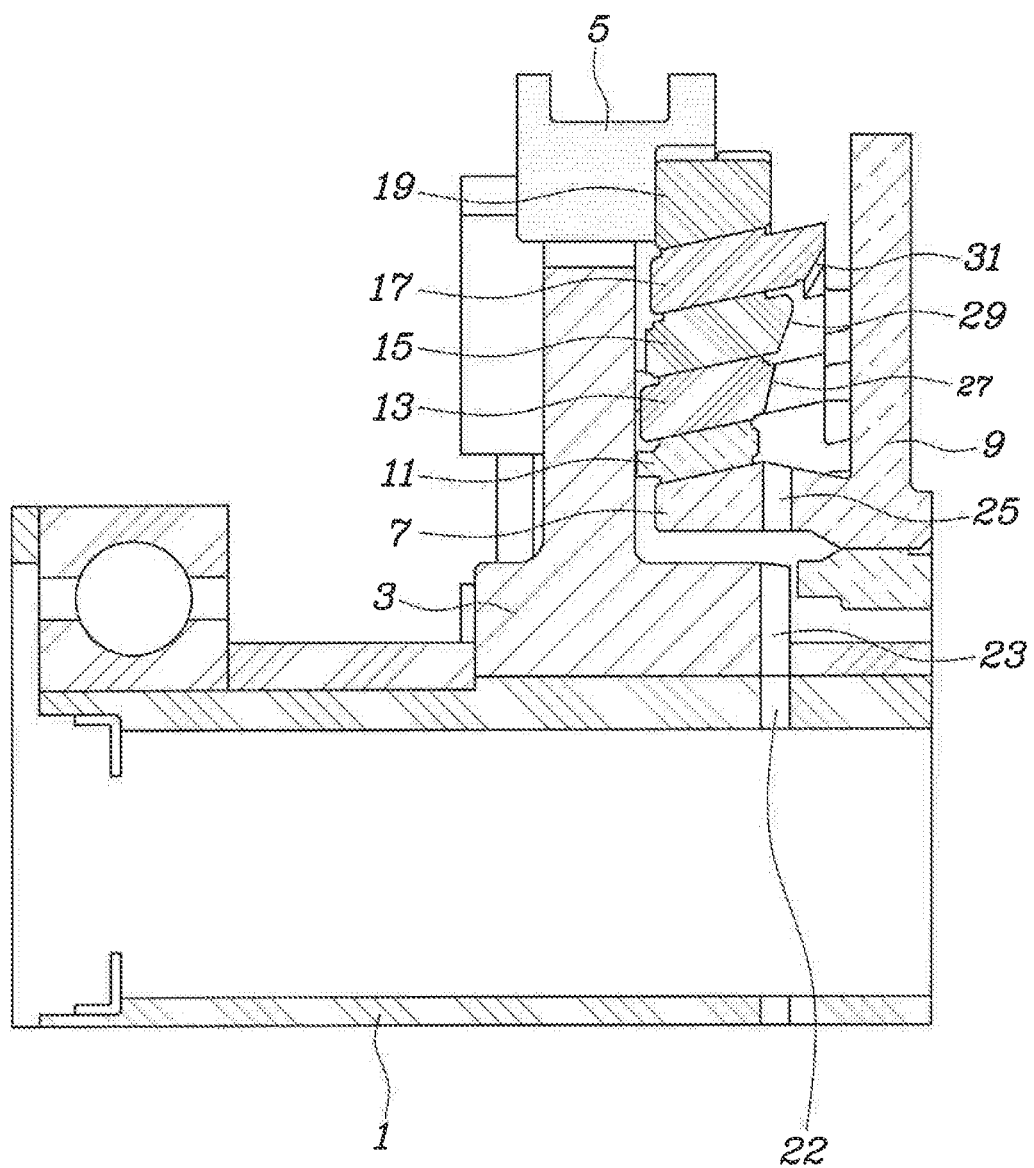
FIG. 4 is a view illustrated in comparison with FIG. 1 and illustrating an operation state in which a torque is transferred.
Figure 5:
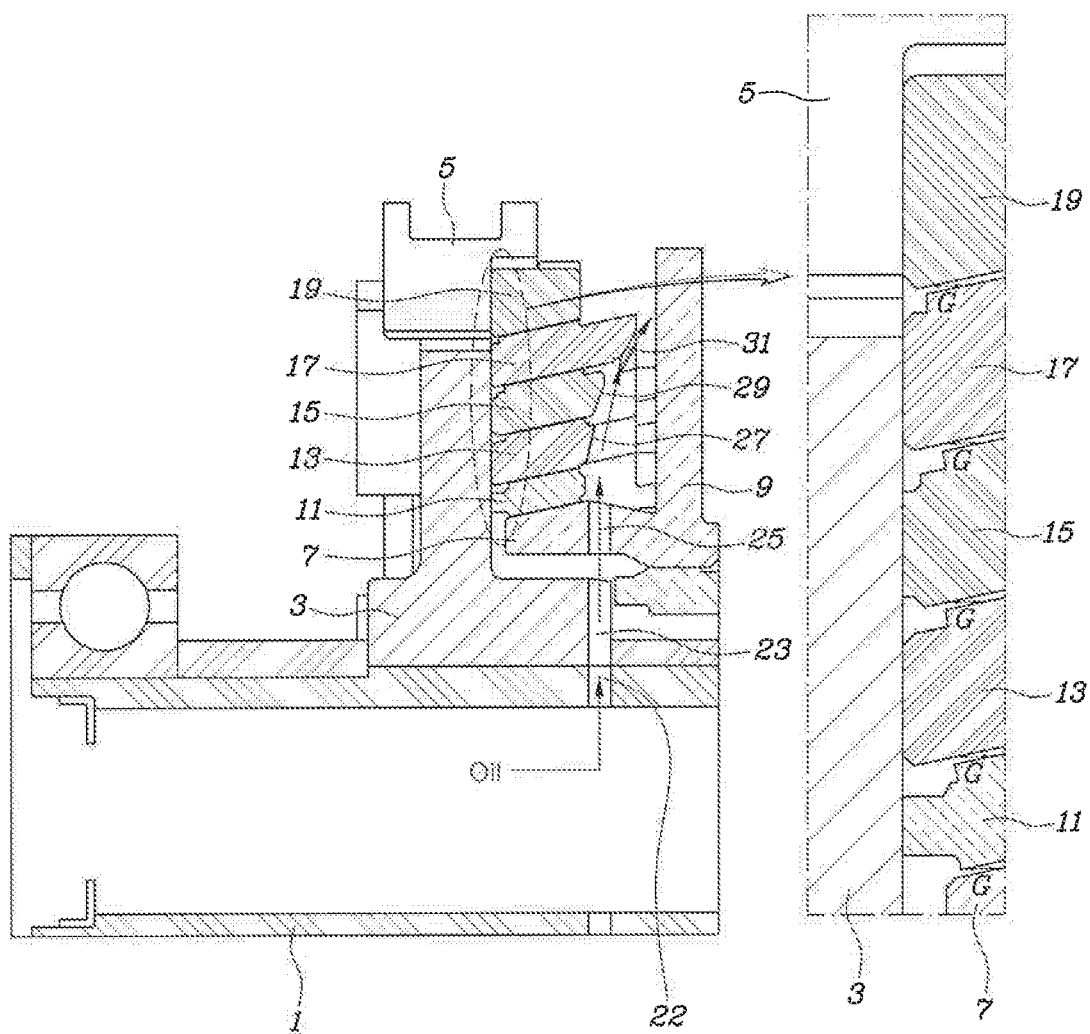
FIG. 5 is a view illustrated in comparison with FIG. 1 and illustrating a release state in which a torque is not transferred.
Figure 6:
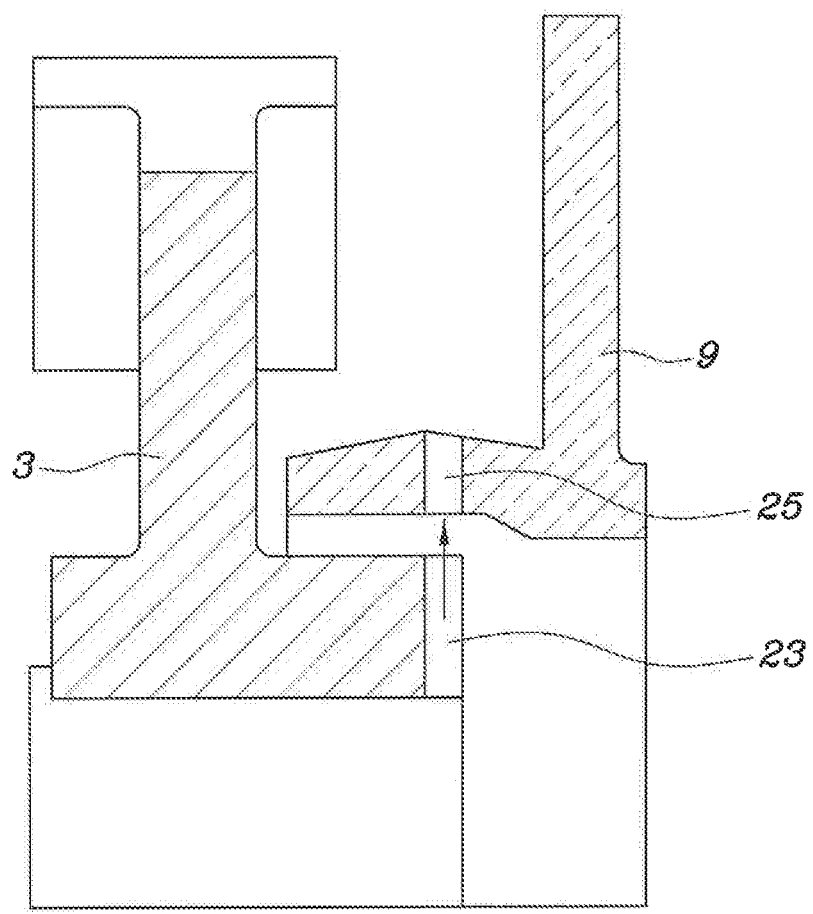
FIG. 6 is an axial cross-sectional view exemplarily illustrating a hub passage and a clutch ring passage formed in the hub and a clutch cone of a clutch ring, respectively.
Figure 7:
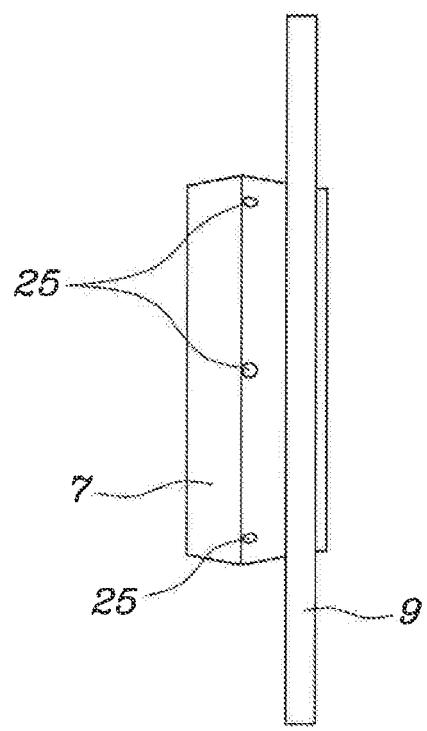
FIG. 7 is a view exemplarily illustrating oil holes, which are clutch ring passages formed in the clutch ring.
Figure 8:
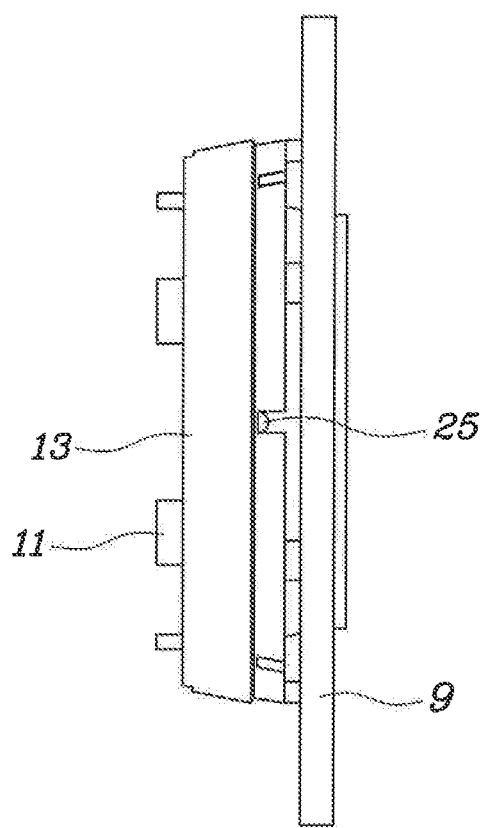
FIG. 8 is a view exemplarily illustrating the clutch ring passage of the clutch cone and an oil groove of an internal middle cone formed so that phases of the clutch ring passage of the oil groove coincide with each other.

For reference, the axial direction refers to a longitudinal direction of the shaft 1, and a radial direction refers to a radial direction of the shaft 1. In an operation state as illustrated in FIG. 4, the first friction ring 11, the second friction ring 15, and the third friction ring 19 rotating together with the hub 3 forms a frictional force while being in close contact with the internal middle cone 13 and the external middle cone 17 rotating together with the clutch ring 9 to allow power to be transferred between the hub 3 and the clutch ring 9. In a release state as illustrated in FIG. 5, the first friction ring 11, the second friction ring 15, and the third friction ring 19 rotate together with the hub 3, and the internal middle cone 13 and the external middle cone 17 may have a speed different from that of the hub 3, together with the clutch ring 9.

Here, as illustrated in FIG. 4, in a state in which the third friction ring 19 is pressed by the sleeve 5, such that all of the third friction ring 19, the external middle cone 17, the second friction ring 15, the internal middle cone 13, the first friction ring 11, and the clutch cone 7 are in close contact with each other, distances by which these components are spaced from the hub 3 in the axial direction are configured to be gradually increased in a sequence of the first friction ring 11, the internal middle cone 13, the second friction ring 15, the external middle cone 17, and the third friction ring 19, as illustrated in FIG. 1.

For reference, FIG. 4 illustrates an operation state in which the sleeve 5 actually presses the third friction ring 19 to allow the torque to be transferred between the hub 3 and the clutch ring 9, and FIG. 1 illustrates a state in which only the sleeve 5 retreats to a neutral state from the state as illustrated in FIG. 4, to compare a distance by which the third friction ring 19 is spaced from the hub 3 in the axial direction with distances by which the other components are spaced from the hub 3.

That is, in the state in which the third friction ring 19 is pressed by the sleeve 5, such that all of the third friction ring 19, the external middle cone 17, the second friction ring 15, the internal middle cone 13, the first friction ring 11, and the clutch cone 7 are maximally moved toward the clutch ring 9 to be sequentially in close contact with each other, distances by which the components described above are spaced from the hub 3 are configured to be gradually increased in a sequence of the first friction ring 11, the internal middle cone 13, the second friction ring 15, the external middle cone 17, and the third friction ring 19.

As described above, when the distances by which the components described above are spaced from the hub 3 are configured to be increased toward the radial direction on the basis of the shaft 1 in the state in which all of the components described above (the first friction ring 11, the internal middle cone 13, the second friction ring 15, the external middle cone 17, and the third friction ring 19) are in close contact with each other toward the clutch ring 9, as illustrated in FIG. 5, in the state in which all of the components described above are in close contact with each other toward the hub 3, gaps G are naturally formed between the respective components due to a structural feature.

When the gaps G are formed between the components as described above, frictional forces are hardly generated between the respective components, such that drags may be significantly reduced.

The state as illustrated in FIG. 5 is the release state in which the cone clutch according to an exemplary embodiment of the present invention does not transfer the power, and a state in which the drags are hardly generated between the respective components is formed to minimize unnecessary power consumption at the time of driving the vehicle, such that fuel efficiency of the vehicle may be ultimately improved.

In an exemplary embodiment of the present invention, the distances by which the first friction ring 11, the internal middle cone 13, the second friction ring 15, the external middle cone 17, and the third friction ring 19 are spaced from the hub 3 in the axial direction are configured to be sequentially increased as multiples of a distance D by which the first friction ring 11 is spaced from the hub 3.

Therefore, when all of the components described above are in close contact with each other toward the hub 3, as illustrated in FIG. 5, all constant intervals are formed between the components, which prevents a gap G formed between any specific components from being relatively small or relatively large to prevent occurrence of an increase phenomenon or the like of a local drag.

Meanwhile, in an exemplary embodiment of the present invention, a surface of the hub 3 facing the first friction ring 11, the internal middle cone 13, the second friction ring 15, the external middle cone 17, and the third friction ring 19 forms a plane perpendicular to the shaft 1.

Furthermore, clutch ring passages 25 through which oil supplied through an internal portion of the shaft 1 and discharged in the radial direction passes and is supplied to a space positioned between the first friction ring 11 and the clutch ring 9 are formed in the clutch cone 7, and inclined surfaces for increasing areas with which the oil passing through the clutch ring passages 25 are in contact while moving to increase a cooling effect and pressing the components toward the hub 3 by a pressure applied by the oil while the oil moves to form the state as illustrated in FIG. 5 and thus generate an effect to reduce the drags are formed on the internal middle cone 13, the second friction ring 15, and the external middle cone 17.

A flow of the oil discharged from the shaft 1 in the radial direction and the inclined surfaces will be described.

The shaft 1 is provided with shaft holes 22 for supplying the oil to the clutch ring passages 25, and when a portion of the hub 3 is positioned between the shaft holes 22 and the clutch ring passages 25, the hub 3 is provided with hub passages 23 through which the oil passing through the shaft holes 22 may linearly move to the clutch ring passages 25.

That is, in a case in which the hub 3 is mounted in a state in which it does not block the shaft holes 22, the hub passages 23 as described above are not separately required, but in a case of the exemplary embodiment illustrated in FIG. 1, the hub 3 is mounted in a state in which it blocks portions of the shaft holes 22, and the hub passages 23 that are in communication with the shaft holes 22 are provided so that the oil passing through the shaft holes 22 may be smoothly discharged in the radial direction thereof.

In an exemplary embodiment of the present invention, the hub passage 23 is formed of an oil groove, and the clutch ring passage 25 is formed of an oil hole.

In a case in which the hub 3 is mounted in a state in which it completely blocks the shaft holes 22, the hub passages 23 need to be processed in a form of an oil hole.

Since the rotation of the hub 3 and the movement of the hub 3 in the axial direction are restricted to the shaft 1, a plurality of hub passages 23 are formed in the same phases as those of the shaft holes 22 along a rotation direction thereof.

A plurality of oil grooves 26 is formed in the internal middle cone 13 so that phases thereof along a circumferential direction coincide with those of the clutch ring passages 25, and some of the oil grooves form a first inclined surface 27, which is one of the inclined surfaces.

That is, since the internal middle cone 13 is mounted in a state in which the rotation thereof is restricted to the clutch ring 9, when the oil grooves of the internal middle cone 13 are formed so that the phases thereof along the circumferential direction coincide with those of the clutch ring passages 25, the oil grooves of the internal middle cone 13 are always maintained in a state in which they are aligned with the clutch ring passages 25, such that a smooth flow of the oil may be secured.

Figure 9:
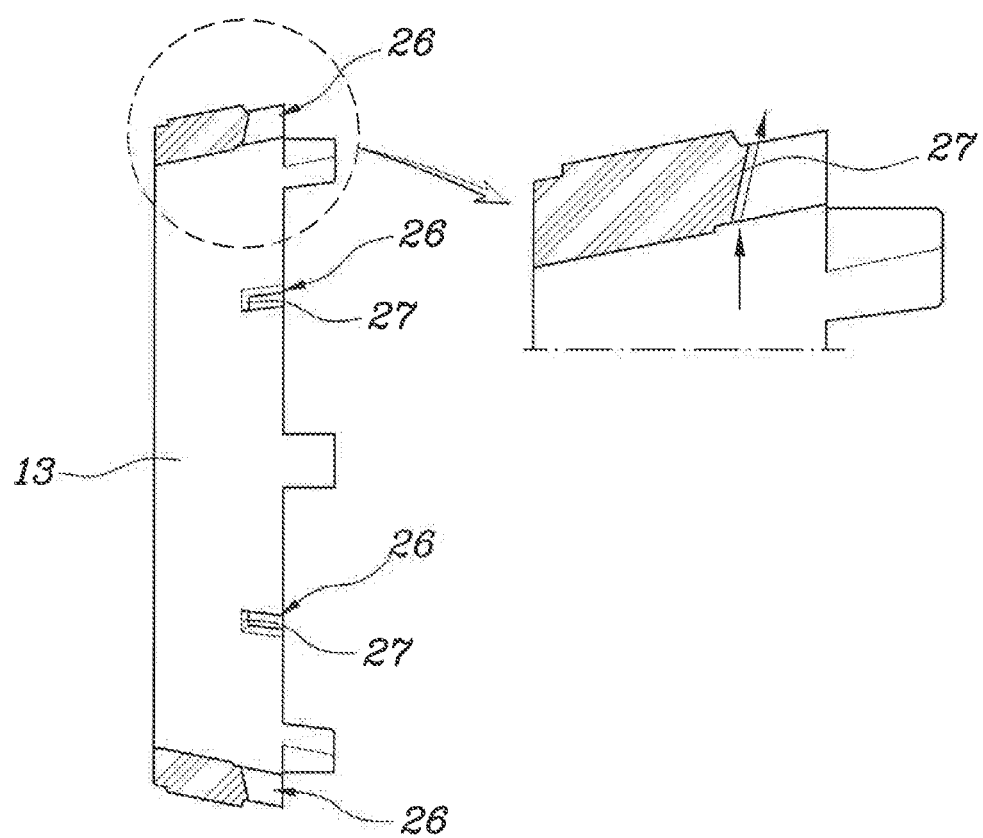
FIG. 9 is an axial cross-sectional view of an internal middle cone, and is a view exemplarily illustrating an oil flow by a first inclined surface.

The first inclined surface 27 is formed by a trajectory along which a straight line inclined toward the clutch ring 9 toward an external diameter direction in a cross section of the internal middle cone 13 along the axial direction rotates along the circumferential direction thereof, as illustrated in FIG. 9.

Therefore, a contact area and time between the internal middle cone 13 and the oil are relatively increased as compared with a case in which a surface perpendicular to the shaft 1 is formed instead of the first inclined surface 1 while the oil discharged in the radial direction through the clutch ring passages 25 forms a flow as illustrated by an arrow along the first inclined surface 27, such that cool performance of the internal middle oil 13 by the oil is improved, and a force for pressing the internal middle cone 13 toward the hub 3 is generated.

Figure 10:
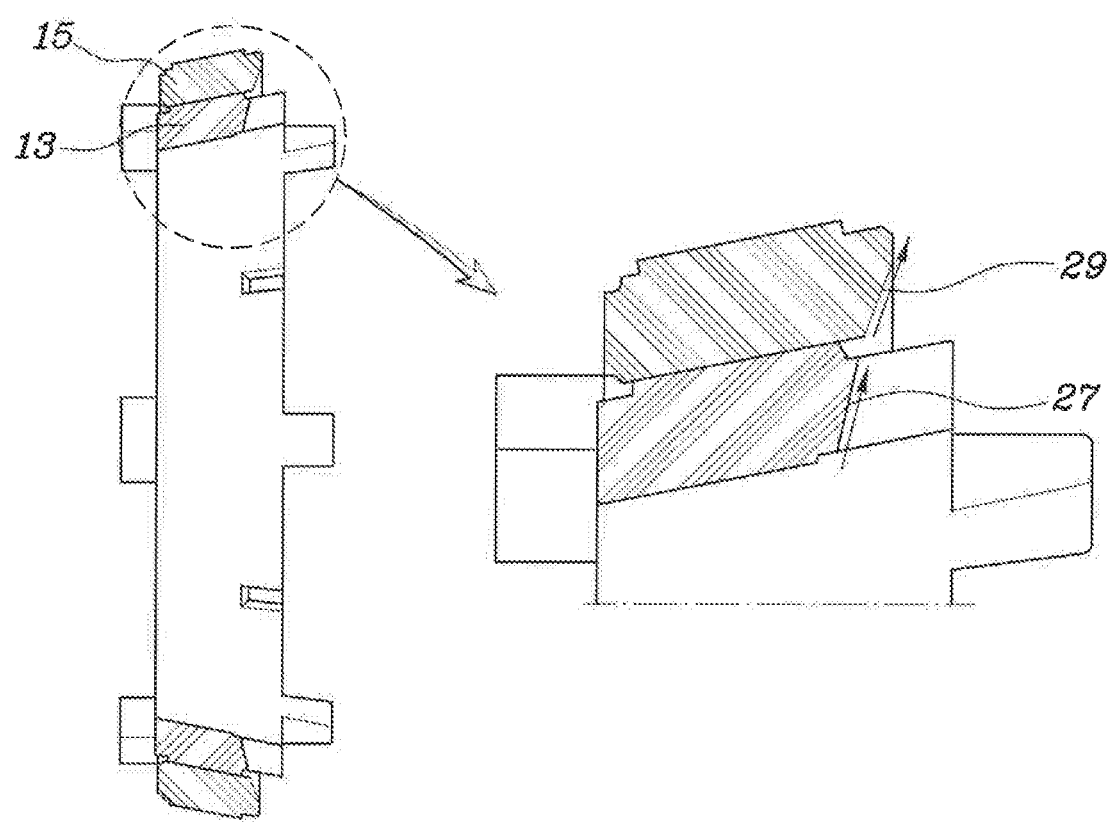
FIG. 10 is an axial cross-sectional view of the internal middle cone and a second friction ring, and is a view exemplarily illustrating an oil flow by the first inclined surface and a second inclined surface.

The second friction ring 15 is a component whose end portion itself close to the clutch ring 9 forms a second inclined surface 29, which is one of the inclined surfaces, as illustrated in FIG. 10.

The second inclined surface 29 is formed by a trajectory along which a straight line starting from a position at which an internal side in the radial direction is further biased toward the clutching ring 9 as compared with the first inclined surface 27 and inclined toward the clutch ring 9 toward the external diameter direction in a cross section of the second friction ring 15 along the axial direction rotates along the circumferential direction thereof, and the second inclined surface 29 forms an angle smaller than an angle formed by the first inclined surface 27 with respect to the shaft 1.

Therefore, due to a contact between the oil passing through the first inclined surface 27 and the entirety of the second inclined surface 29 when the oil moves from an internal side of the second inclined surface 29 to an external side of the second inclined surface 29 while being in contact with the second inclined surface 29, cooling performance of the second friction ring 15 may be effectively secured and the second friction ring 15 may be effectively pressed toward the hub 3.

Figure 11:
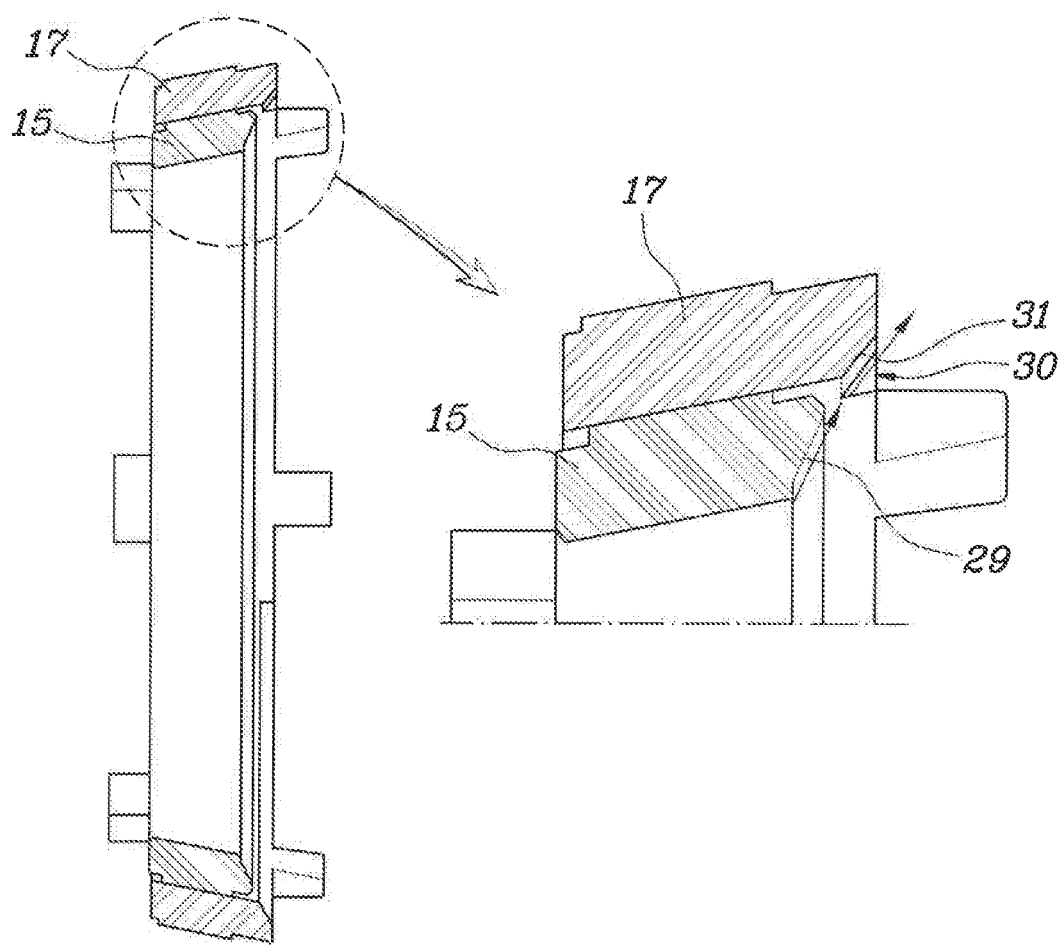
FIG. 11 is an axial cross-sectional view of the second friction ring and an external middle cone, and is a view exemplarily illustrating an oil flow by the second inclined surface and a third inclined surface.
Figure 12:
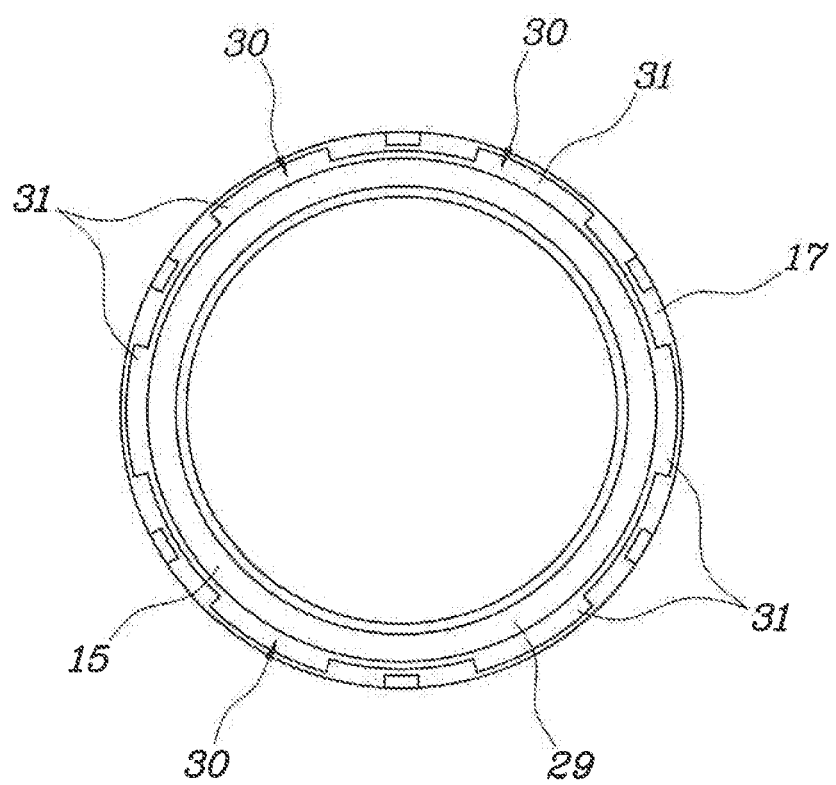
FIG. 12 is a view exemplarily illustrating the second friction ring and the external middle cone of FIG. 11 as viewed the right side thereof.

A plurality of oil grooves 30 is formed in the external middle cone 17 so that phases thereof along the circumferential direction coincide with those of the oil grooves of the internal middle cone 13, as illustrated in FIG. 11 and FIG. 12, and some of the oil grooves form a third inclined surface 31, which is one of the inclined surfaces.

The oil grooves of the external middle cone 17 are formed to have a width greater, in the circumferential direction, than that of the oil grooves of the internal middle cone 13, such that the oil passing through the internal middle cone 13 and the second friction ring 15 may be smoothly moved in the external diameter direction thereof.

The third inclined surface 31 is formed by a trajectory along which a straight line starting from a position at which an internal side in the radial direction is further biased toward the clutching ring 9 as compared with the second inclined surface 29 and inclined toward the clutch ring 9 toward the external diameter direction in a cross section of the external middle cone 17 along the axial direction rotates along the circumferential direction thereof, and the third inclined surface 31 forms an angle smaller than an angle formed by the second inclined surface 29 with respect to the shaft 1.

Therefore, due to a contact between the oil passing through the second inclined surface 29 and the entirety of the third inclined surface 31 when the oil moves from an internal side of the third inclined surface 31 to an external side of the third inclined surface 31 while being in contact with the third inclined surface 31, cooling performance of the external middle cone 17 may be effectively secured and the external middle cone 17 may be effectively pressed toward the hub 3.

For reference, the third friction ring 19 is cooled and lubricated by oil along a wall surface of a case of a transmission.

As described above, excellent cooling performance of the components described above is secured due to increases in a relative contact area and time between the components and the oil by the inclined surfaces, such that durability of the respective components may be improved, and a force for moving the components toward the hub 3 is applied to the components by a flow of the oil advancing in the radial direction of the shaft 1 through the hub passages 23 and the clutch ring passages 25, such that the state as illustrated in FIG. 5 is naturally formed to enable a significant reduction of the drag in the release state.

That is, in a state in which the third friction ring 19 is not pressed toward the clutch ring 9 by the sleeve 5, a state in which the components are basically pressed toward the hub 3 by the flow of the oil is formed.

Therefore, when the sleeve 5 is in the neutral state as illustrated in FIG. 1, the components are naturally pressed toward the hub 3 by the flow of the oil to form the release state as illustrated in FIG. 5, such that a state in which the drags are minimized is formed.

One side portion of the first friction ring 11 is positioned adjacent to the hub 3 on the basis of the center portion of the clutch ring passages 25, and the first friction ring 11 is thus pressed by the oil passing through the hub passages 23 and the clutch ring passages 25 and then discharged in the radial direction thereof. Therefore, the first friction ring 11 is pressed toward the hub 3.

Meanwhile, the second inclined surface 29 of the second friction ring 15 is formed so that the angle formed by the second inclined surface 29 with respect to the shaft 1 is smaller than the angle formed by the first inclined surface 27 of the internal middle cone 13 with respect to the shaft 1, and the third inclined surface 31 of the external middle cone 17 is formed so that the angle formed by the third inclined surface 31 with respect to the shaft 1 is smaller than the angle formed by the second inclined surface 29 of the second friction ring 15 with respect to the shaft 1, such that the oil discharged through the hub passages 23 and the clutch ring passages 25 sequentially applies a pressure to the first inclined surface 27, the second inclined surface 29, and the third inclined surface 31 while advancing in the radial direction thereof, generating a force for moving the components toward the hub 3.

That is, in an exemplary embodiment of the present invention, due to a structural feature that the first friction ring 11, the internal middle cone 13, the second friction ring 15, the external middle cone 17, and the third friction ring 19 form together with the hub 3 and the clutch ring 9, in the operation state in which the power is transferred between the hub 3 and the clutch ring 9, relatively wide friction surfaces are formed within a relatively small volume to provide a larger torque transfer capacity, and in the release state in which the power is not transferred, the gaps G between the respective components used to form the friction surfaces may be naturally secured to minimize the drags, which may contribute to improvement of fuel efficiency of the vehicle, and the contact area and time between the oil and the respective components may be increased to improve cooling and lubrication performance, improving durability.

The cone clutch for a vehicle according to an exemplary embodiment of the present invention may implement a relatively large torque transfer capacity while having a simple and compact configuration and occupying a relatively small volume and may secure sufficient durability by allowing lubrication and cooling of used components to be smoothly performed.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cone clutch apparatus for a vehicle, the cone clutch apparatus comprising:
    a hub mounted so that a movement of the hub in an axial direction of the hub and a rotation of the hub are restricted to a shaft;
    a sleeve mounted so that a rotation of the sleeve is restricted to an external side of the hub and a movement of the sleeve in the axial direction is allowed;
    a clutch ring mounted so that a movement of the clutch ring in the axial direction is restricted and a rotation of the clutch ring is allowed with respect to the shaft and integrally including a clutch cone protruding toward the hub and having an external diameter which is reducing;
    a first friction ring mounted between the clutch ring and the hub, mounted so that a rotation of the first friction ring is restricted with respect to the hub, and pressed toward the clutch ring along the axial direction to allow a frictional force to be applied between the first friction ring and the clutch cone;
    an internal middle cone mounted so that a rotation of the internal middle cone is restricted with respect to the clutch ring and having an internal side surface in contact with an external side surface of the first friction ring;
    a second friction ring mounted so that a rotation of the second friction ring is restricted with respect to the hub and having an internal side surface in contact with an external side surface of the internal middle cone;
    an external middle cone mounted so that a rotation of the external middle cone is restricted with respect to the clutch ring and having an internal side surface in contact with an external side surface of the second friction ring; and
    a third friction ring mounted so that a rotation of the third friction ring is restricted with respect to the hub and having an internal side surface in contact with an external side surface of the external middle cone when the third friction ring is pressed by the sleeve,
    wherein at least a clutch ring passage through which oil supplied through an internal portion of the shaft and discharged in a radial direction of the shaft passes and supplied to a space positioned between the first friction ring and the clutch ring, is formed in the clutch cone, and
    wherein inclined surfaces for increasing oil-contact areas with which the oil passing through the at least a clutch ring passage are in contact as the oil moves are formed on the internal middle cone, the second friction ring, and the external middle cone,
    wherein a plurality of first oil grooves is formed in the internal middle cone so that a phase of the plurality of first oil grooves along a circumferential direction coincides with a phase of the at least a clutch ring passage, and
    wherein at least one of the plurality of first oil grooves forms a first inclined surface which is one of the inclined surfaces.

2. The cone clutch apparatus for the vehicle of claim 1,
    wherein the shaft is provided with at least a shaft hole for supplying the oil to the at least a clutch ring passage, and
    wherein the hub is provided with at least a hub passage through which the oil passing through the at least a shaft hole linearly moves toward the at least a clutch ring passage when a portion of the hub is disposed between the at least a shaft hole and the at least a clutch ring passage.

3. The cone clutch apparatus for the vehicle of claim 2,
    wherein the at least a hub passage includes an oil groove, and
    wherein the at least a clutch ring passage includes an oil hole.

4. The cone clutch apparatus for the vehicle of claim 1,
    wherein the first inclined surface is formed by a first trajectory along which a straight line inclined toward the clutch ring toward an external diameter direction in a cross section of the internal middle cone along the axial direction rotates along the circumferential direction thereof.

5. The cone clutch apparatus for the vehicle of claim 4,
    wherein an end portion of the second friction ring adjacent to the clutch ring forms a second inclined surface which is one of the inclined surfaces.

6. The cone clutch apparatus for the vehicle of claim 5,
    wherein the second inclined surface is formed by a second trajectory along which a straight line starting from a position at which an internal side in the radial direction is further biased toward the clutching ring as compared with the first inclined surface and inclined toward the clutch ring toward the external diameter direction in a cross section of the second friction ring along the axial direction rotates along the circumferential direction thereof.

7. The cone clutch apparatus for the vehicle of claim 6, wherein the second inclined surface forms an angle smaller than an angle formed by the first inclined surface with respect to the shaft.

8. The cone clutch apparatus for the vehicle of claim 7, wherein a plurality of second oil grooves is formed in the external middle cone so that a phase of the plurality of second oil grooves along the circumferential direction coincides with a phase of the plurality of first oil grooves of the internal middle cone, and
wherein at least one of the plurality of second oil grooves forms a third inclined surface which is one of the inclined surfaces.

9. The cone clutch apparatus for the vehicle of claim 8, wherein the plurality of second oil grooves of the external middle cone is formed to have a width greater, in the circumferential direction, than a width of the plurality of first oil grooves of the internal middle cone.

10. The cone clutch apparatus for the vehicle of claim 8, wherein the third inclined surface is formed by a third trajectory along which a straight line starting from a position at which an internal side in the radial direction is further biased toward the clutching ring as compared with the second inclined surface and inclined toward the clutch ring toward the external diameter direction in a cross section of the external middle cone along the axial direction rotates along the circumferential direction thereof.

11. The cone clutch apparatus for the vehicle of claim 10, wherein the third inclined surface forms an angle smaller than an angle formed by the second inclined surface with respect to the shaft.

\* \* \* \* \*